(12) United States Patent
     Mohl (10) Patent No.: US 7,890,793 B1
(45) Date of Patent: Feb. 15, 2011

(54) TECHNIQUES FOR RESTORING FILE SYSTEM RESOURCES

(75) Inventor: Steven E. Mohl, Sanford, FL (US)

(73) Assignee: Symantec Corporation, Mountain View, CA (US)

( * ) Notice: Subject to any disclaimer, the term of this patent is extended or adjusted under 35 U.S.C. 154(b) by 350 days.

(21) Appl. No.: 12/124,820

(22) Filed: May 21, 2008

(51) Int. Cl.
     *G06F 11/00* (2006.01)
(52) U.S. Cl. ......................................................... 714/3
(58) Field of Classification Search ........................ 714/3
     See application file for complete search history.

(56) References Cited

U.S. PATENT DOCUMENTS 7,328,325 B1 * 2/2008 Solis et al. .................. 711/202
7,334,157 B1 * 2/2008 Graf et al. ..................... 714/13
2009/0089781 A1 * 4/2009 Shingai et al. ................. 718/1
2009/0222496 A1 * 9/2009 Liu et al. ..................... 707/204

* cited by examiner

*Primary Examiner*—Michael C Maskulinski
(74) *Attorney, Agent, or Firm*—Hunton & Williams, LLP (57) ABSTRACT

Techniques for restoring file system resources are disclosed. In one particular exemplary embodiment, the techniques may be realized as a method for restoring file system resources comprising determining source configuration information of one or more file system resources, modeling a source configuration based at least in part on the source configuration information, determining target configuration information, modeling a target configuration based at least in part on the target configuration information, generating restoration instructions to map the source configuration to the target configuration, and executing the restoration instructions to restore the one or more file system resources of the source configuration to the target configuration.

20 Claims, 5 Drawing Sheets

| Class/Table | Purpose |
|---|---|
| CZfsBase | Abstract base class containing attributes/methods common to both storage pools and filesystems (Native Properties). |
| CZfsStoragePool | Derives from CZfsBase and contains attributes/methods unique to storage pools. Contains foreign key reference to CVolumeInfo. |
| CZfsDeviceToStoragePool | Contains attributes/methods pertaining to the device type (CONCAT, MIRROR, RAIDZ1, RAIDZ2, and SPARE). Can contain multiple devices. Contains foreign key reference to CZfsStoragePool. |
| CZfsStoragePoolDevice | Links physical device to device type specification. Contains foreign key reference to CZfsDeviceToStoragePool. |
| CZfsStoragePoolDeviceToSolarisDisk | Contains foreign key references linking CZfsStoragePoolDevice to CSolarisDisk. |
| CZfsStoragePoolDeviceToSolarisSlice | Contains foreign key references linking CZfsStoragePoolDevice to CSolarisSlice. |
| CZfsFileSystem | Derives from CZfsBase and contains attributes/methods unique to filesystems. Contains foreign key reference to CZfsStoragePool. |
| CZfsVolume | Contains attributes/methods unique to volumes. Contains foreign key reference to CZfsStoragePool. |
| CZfsUserProperty | Multi-purpose class/table containing property/value pairs for user defined properties. Contains foreign key references to CZfsStoragePool, CZfsFileSystem, and CZfsVolume. Only one foreign key reference may be in play at a time for each instance. |

Fig. 5

TECHNIQUES FOR RESTORING FILE SYSTEM RESOURCES

FIELD OF THE DISCLOSURE

The present disclosure relates generally to file system restoration and, more particularly, to techniques for restoring file system resources.

BACKGROUND OF THE DISCLOSURE

In the event of a system failure, restoration of the system may require a restoration of not only data, but also an underlying file system, an operating system, and other components. In the event of a system failure caused by a hardware issue, a fire, a flood, or other events, it may be necessary to restore an operating system, file system, data, and other components to one or more new hardware platforms. Installing an operating system, a file system, and other components required for restoration of a failed system on a new system is sometimes referred to as a bare metal restore. Restoration of a file system on a new system may require an identical configuration between the new system and an old system. This may require the availability of identical hardware, which may also need to be configured identically. For example, a file system using a certain level of RAID (Redundant Arrays of Independent Disks) with a certain amount of storage may not be capable of restoration on a different configuration. Additionally, even if an identically configured hardware platform is available, it may be required to first determine the configuration of the failed system. This may be difficult to determine in an orderly and time effective manner from backups and documentation. Furthermore, certain configurations of failed systems may utilize mirroring, spare disks, and other resources. It may be cost prohibitive for a corporation or other entity to maintain an identical configuration on a secondary system.

In view of the foregoing, it may be understood that there are significant problems and shortcomings associated with current file system restoration technologies.

SUMMARY OF THE DISCLOSURE

Techniques for restoring file system resources are disclosed. In one particular exemplary embodiment, the techniques may be realized as a method for restoring file system resources comprising determining source configuration information of one or more file system resources, modeling a source configuration based at least in part on the source configuration information, determining target configuration information, modeling a target configuration based at least in part on the target configuration information, generating restoration instructions to map the source configuration to the target configuration, and executing the restoration instructions to restore the one or more file system resources of the source configuration to the target configuration.

In accordance with other aspects of this particular exemplary embodiment, the techniques may be realized as an article of manufacture for restoring file system resources. The article of manufacture may comprise at least one processor readable carrier and instructions carried on the at least one carrier, wherein the instructions are configured to be readable from the at least one carrier by at least one processor and thereby cause the at least one processor to operate so as to determine source configuration information of one or more file system resources, model a source configuration based at least in part on the source configuration information, determine target configuration information, model a target configuration based at least in part on the target configuration information, generate restoration instructions to map the source configuration to the target configuration, and execute the restoration instructions to restore the one or more file system resources of the source configuration to the target configuration.

In accordance with further aspects of this particular exemplary embodiment, the techniques may be realized as a system for restoring file system resources comprising one or more processors communicatively coupled to a server, wherein the server is configured to determine source configuration information of one or more file system resources, model a source configuration based at least in part on the source configuration information, determine target configuration information, model a target configuration based at least in part on the target configuration information, generate restoration instructions to map the source configuration to the target configuration, and execute the restoration instructions to restore the one or more file system resources of the source configuration to the target configuration.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
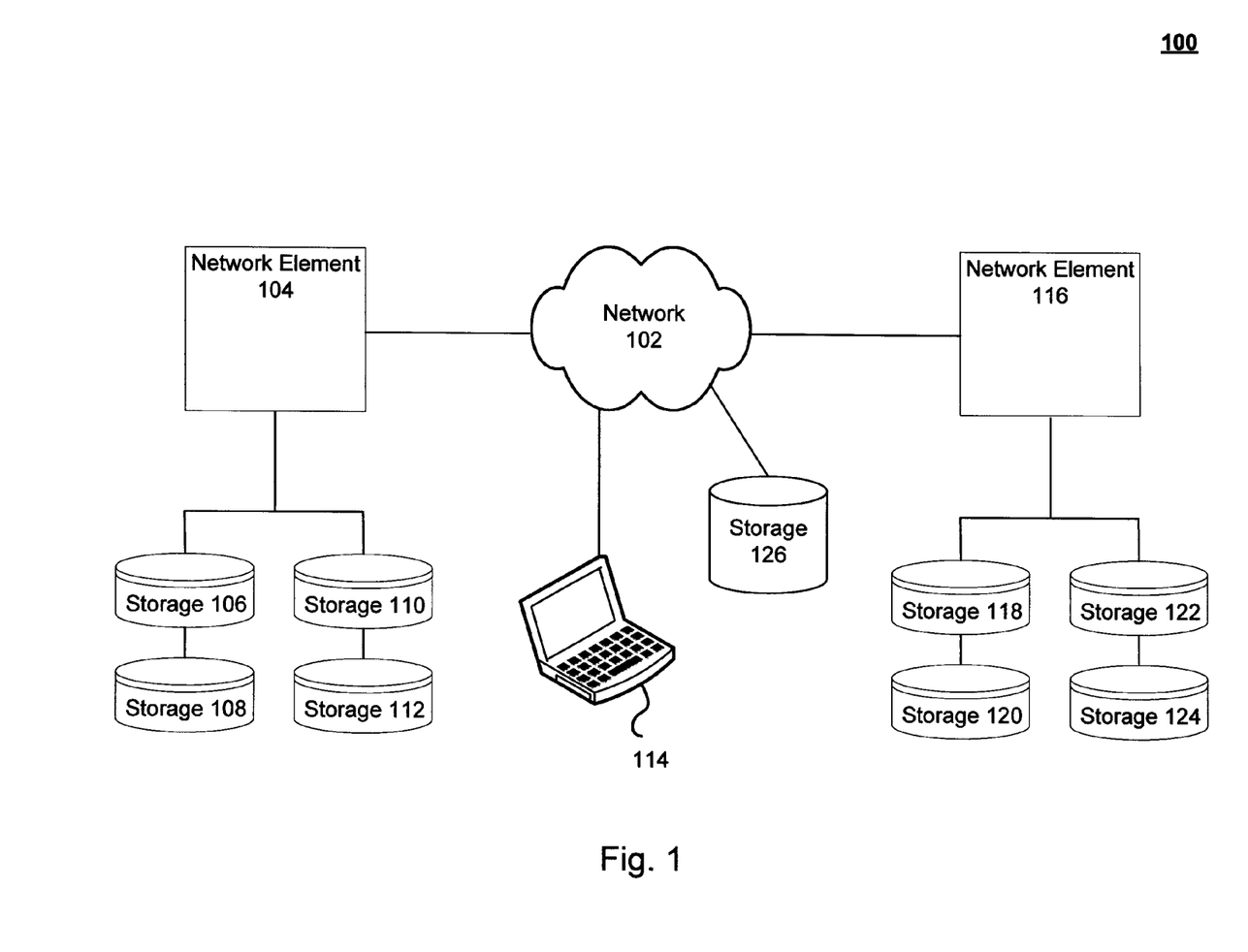
FIG. 1 shows a system for file system restoration in accordance with an embodiment of the present disclosure.

Referring to FIG. 1, there is shown a system 100 for file system restoration in accordance with an embodiment of the present disclosure. FIG. 1 is a simplified view of system 100, which may include additional elements that are not depicted. In system 100, network elements 104 and 116 may be communicatively coupled to network 102. Network element 104 may be communicatively coupled to storage 106, 108, 110, and 112. Network element 116 may be communicatively coupled to storage 118, 120, 122, and 124. Computer 114 may be communicatively coupled to network 102. Storage 126 may be communicatively coupled to network 102.

Network 102 may be a local area network (LAN), a wide area network (WAN), the Internet, a cellular network, a satellite network, or another network that permits communication between network elements 104 and 116, and other devices communicatively coupled to network 102.

Network elements 104 and 116 may be application servers, backup servers, network storage devices, or other devices communicatively coupled to network 102. Network elements 104 and 116 may utilize storage 106, 108, 110, 112, 118, 120, 122, and 124 for the storage of application data, backup data, or other data.

Storage 106, 108, 110, 112, 118, 120, 122, and 124 may be local, remote, or a combination thereof to network elements 104 and 116. Storage 106, 108, 110, 112, 118, 120, 122, and 124 may utilize, for example, RAID, striped disks, hot spare disks, tape, or other network accessible storage. In one or more embodiments, storage 106, 108, 110, 112, 118, 120, 122, and 124 may be, for example, a storage area network (SAN), an internet small computer systems interface (iSCSI) SAN, a Fibre Channel SAN, a common Internet File System (CIFS), network attached storage (NAS), or a network file system (NFS).

Computer 114 may be a desktop computer, a laptop computer, a server, or other computer capable of system resource analysis. Computer 114 may receive data from user input, a network management system, a network provisioning system, a management information base, a database, a file, a web service, and/or an application programming interface. Computer 114 may query other systems and/or local or remote storage such as data storage 126, network elements 104 and 116, and storage 106, 108, 110, 112, 118, 120, 122, and 124 to obtain network information.

In one or more embodiments, computer 114 may serve as a user terminal for an administrator or other user enabling the restoration of one or more file system resources. In some embodiments, computer 114 may represent a server or other network element capable of querying one or more hosts, network storage, or other network accessible elements to determine system resources, configuration data, and other details. Computer 114 may gather or receive network resource information in one or more formats. For example, computer 114 may receive information about a host via application programming interfaces (APIs), interface tables, remote procedure calls (rpcs), web services, Extensible Markup Language (XML) based interfaces, Simple Object Access Protocol (SOAP) based interfaces, and other interfaces for sending or receiving network element resource and configuration information. Computer 114 may parse received information and may store the information as part of a model. In one or more embodiments, computer 114 may receive a snapshot or other backup of a host and may parse one or more backups to determine a host configuration. Computer 114 may generate one or more commands or instructions to build, configure, recover, and/or restore one or more network resources. Computer 114 may utilize one or more tools or utilities to query network resources, model network resources, and/or restore network resources. Computer 114 may utilize storage 126 to store received information, one or more models, code for restoration of one or more systems, and other data.

Computer 114 may provide a user interface enabling a user to view data related to one or more network resources such as a configuration of a host file system. Computer 114 may be a web server or other server providing an interface for one or more remote users. Computer 114 may enable a user to view actual or modeled resources. Computer 114 may enable a user to map modeled resources onto actual resources. For example, computer 114 may enable a user to map a configuration of a previous modeled host system to a second computing platform. This may enable a user of computer 114 to restore a configuration of a modeled system to a second host or computing platform. In one or more embodiments, the mapping process may enable a user to ensure that a second computing platform contains sufficient resources to accommodate a modeled configuration. In some embodiments, an interface provided by computer 114 may provide an error message if a second computing platform is incompatible or contains insufficient resources, such as disk space, to accommodate a modeled configuration. In one or more embodiments, an interface provided by computer 114 may enable a user to modify a modeled configuration to accommodate a second computing platform. For example, computer 114 may enable a user to map a modeled configuration of a mirrored file system to an unmirrored file system. This may enable the restoration of a mirrored file system of a failed host to an unmirrored file system on a second host when the second host has insufficient resources for mirroring. Computer 114 may enable mapping between mirrored configurations and unmirrored configurations, mapping between striped configurations and unstriped configurations, mapping between different levels of RAID configurations, and mapping between configurations with spare storage and without spare storage. Computer 114 may enable the mapping of a configuration to a system with greater or fewer resources. For example, a configuration may be edited to add mirroring or spare disks prior to restoration on a target or secondary system.

Discovery of a configuration may occur in several ways. For example, a user may utilize computer 114 to discover a configuration. In this example, a user may specify the network address of a computing platform and computer 114 may receive configuration information and/or retrieve configuration information for that computing platform. Discovery may also be performed when a restoration is occurring. If a configuration of a target platform does not match a modeled target configuration, a user may be prompted by an error handling routine of the restoration code. The user may utilize computer 114 to rediscover the target configuration, remap a stored configuration to a target configuration, regenerate restoration code and/or otherwise address the inconsistencies.

Computer 114 may also verify that a computing platform is configured correctly to accommodate a modeled configuration. Computer 114 may detect problems with a discovered configuration and/or generate restoration code which may handle errors or constraints when the restoration code executes on a restoring client. For example, computer 114 may detect that a configuration has disk labels that are compatible with a file system configuration. If a ZFS (Zettabyte File System) file system is to be restored to a computing platform, computer 114 may verify that disk labels of a configuration are formatted as EFI (Extensible Firmware Interface) labeled disks. Computer 114 may generate restoration code that may verify one or more disk labels of a target platform and/or a restoring client when the restoration code executes on the target platform. Restoration code generated by computer 114 may provide a prompt or an error to a user if an incompatible disk label is detected. Computer 114 may generate restoration code to execute on a target platform which may enable a user to re-label disk labels in a configuration as EFI (Extensible Firmware Interface) labeled disks or SMI (Sun Microsystems, Inc) labeled disks. Computer 114 may enable the enforcement of configuration constraints, business rules, or other constraints. For example, computer 114 may verify that adequate space exists for a configuration prior to restoration.

Storage 126 may be network accessible storage and may be local, remote, or a combination thereof to network elements 104 and 116. Storage 126 may utilize tape, disk, a storage area network (SAN), or other computer accessible storage. In one or more embodiments, Storage 126 may represent a database, which may be utilized to store one or more file system configurations. Storage 126 may use a relational methodology, flat files, an object oriented methodology or other methodologies to represent one or more file system configurations or other data. Storage 126 may utilize a combination of methodologies. For example, storage 126 may store information about components of one or more file system configurations which may be represented as objects. The relationship between these objects may be modeled in a normalized manner and stored in a relational database. The relationship between entities as modeled in storage 126 may reflect a parent/child, or a lower level to a higher level software component, or a higher level to lower level software component relationships. For example, a first entity, table, or storage object may represent a host. A second entity may represent a storage device. There may be multiple storage devices modeled for a single host object. Another entity may represent a storage abstract data type such as a volume, a partition, a file system, a logical drive, a slice, a plex, a subdisk, a disk group, a storage pool, or another storage abstract data type. The entities utilized in a model, as well as the relationships between the entities in a model, may depend upon a type or configuration of file system model stored in storage 126. Storage 126 may be utilized to store storage object configuration information and storage object relationships, as well as information about one or more storage objects. For example, a model stored in storage 126 modeling one or more ZFS file systems may contain information about a number of file systems to a storage pool, a number of volumes to a storage pool, a number of devices to a storage pool, a number of slices to a storage device, or other storage object relationships. A model stored in storage 126 may also reflect storage configuration details such as, for example, a RAID level, striping, concatenation, and mirroring. Storage 126 may contain configuration information about objects such as whether a disk or other storage device is a spare device.

In one or more embodiments, file system configurations may be modeled utilizing entities representing high level file system object types. These entities may be utilized to store parent classes. One or more child entities may be linked to a parent entity and may be utilized to store subclasses. An entity linked to a child entity may utilize name/value pairs or other structures to store attributes of a subclass.

In one or more embodiments, storage 126 may utilize a hierarchical storage system to model one or more file system configurations. In some embodiments, a file system configuration may be stored as a flat file utilizing storage 126.

Storage of a modeled configuration in storage 126 may enable a process to logically navigate the model in order to generate restoration code. For example, a model may be structured such that a process may iteratively navigate from a lowest level to a highest level of a model while generating restoration code. This may enable the restoration code to be written in an order that it runs such that lower level system resources may be created and/or configured prior to higher level resources which may depend upon them. Elements of a model which are at a same level, may, in some embodiments, be created and/or configured in parallel.

In some embodiments, storage 126 may model resources such as network resources, host resources, software resources, licensing information, network configuration information, operating system information, and other details. Resource information modeled in storage 126 may facilitate bare metal restoration of one or more systems.

In one or more embodiments, business rules, constraints, triggers, or other data integrity devices may be utilized. Rules may ensure that a modeled configuration complies with file system limitations or constraints, device constraints, formatting constraints, business rules, or other data integrity logic. For example, logic contained on storage 126, on computer 114, or on another device may determine that a modeled configuration may require a certain number of associated storage devices before the configuration may be depicted as complying with a particular RAID level. In one or more embodiments, a configuration may be depicted as configured for a particular RAID level, but may display an error indicating that the configuration requires additional associated storage devices.

Storage 126 may store logic for mapping modeled configurations to target platforms, logic for editing modeled configurations, logic for parsing received network element data, logic for modeling network element data, logic for providing a user interface, logic for implementing stored configurations, and other logic.

In one or more embodiments a model may be created and stored in memory, such as in memory of computer 114.

Figure 2:
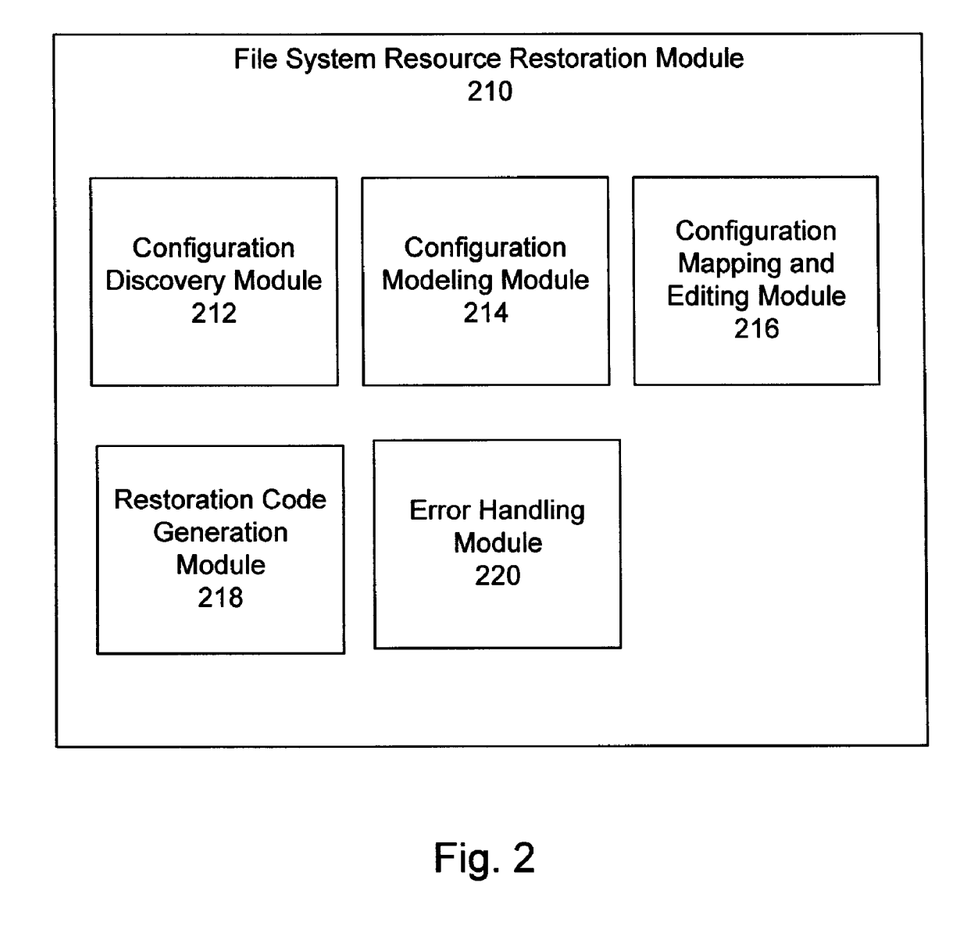
FIG. 2 shows a module for file system restoration in accordance with an embodiment of the present disclosure.

Referring to FIG. 2, there is shown a module 210 for restoration of file system resources in accordance with an exemplary embodiment of the present disclosure. As illustrated in FIG. 2, file system resource restoration module 210 may contain one or more components, including configuration discovery module 212, configuration modeling module 214, configuration mapping and editing module 216, restoration code generation module 218, and error handling module 220.

Configuration discovery module 212 may receive, query, or retrieve network resource information. For example, configuration discovery module 212 may receive information, such as a snapshot, which may contain information related to a configuration to be modeled.

Configuration modeling module 214 may utilize information received by configuration discovery module 212 to model one or more computing platform configurations. Configuration modeling module 214 may parse received information and may represent information in a standardized format. For example, configuration modeling module 214 may parse received information, such as a snapshot, model a configuration of a file system, and store it. The model may be stored in a hierarchical manner, in a normalized relational manner, according to an object oriented methodology, according to other methodologies, or according to a combination of methodologies.

Configuration mapping and editing module 216 may enable the mapping of a modeled configuration to a platform. For example, a modeled file system may be mapped to a second platform so that a modeled storage device, such as a disk of the modeled file system, may be mapped to an available storage device, such as a disk on the second platform. Configuration mapping and editing module 216 may enable the editing of a configuration. For example, configuration mapping and editing module 216 may enable the editing of a modeled configuration to match resources of an available computing platform. For example, a user may utilize configuration mapping and editing module 216 via an interface, to change a RAID level of a configuration or to eliminate mirroring. This may enable a stored configuration of a failed host to be restored on a secondary host with fewer available resources.

Restoration code generation module 218 may utilize a modeled configuration, user input, and/or other data to generate code for restoring a modeled configuration. In one or more embodiments, restoration code generation module 218 may enable bare metal restoration of one or more systems, file systems, or other networked resources.

Error handling module 220 may enable the trapping and handling of one or more errors. For example, error handling module 220 may enable the trapping of a mapping error which may occur if an attempt is made to map a modeled configuration to a computing platform with insufficient or incompatible resources. Error handling module 220 may prompt a user with an error message, and may enable a user to utilize configuration mapping and editing module 216 to address a source of an error. In another example, error handling module 220 may enable a user or a process to retry execution of restoration code. This may enable a restoration of a modeled configuration if, for example, a target system was offline during an initial restoration attempt.

Figure 3:
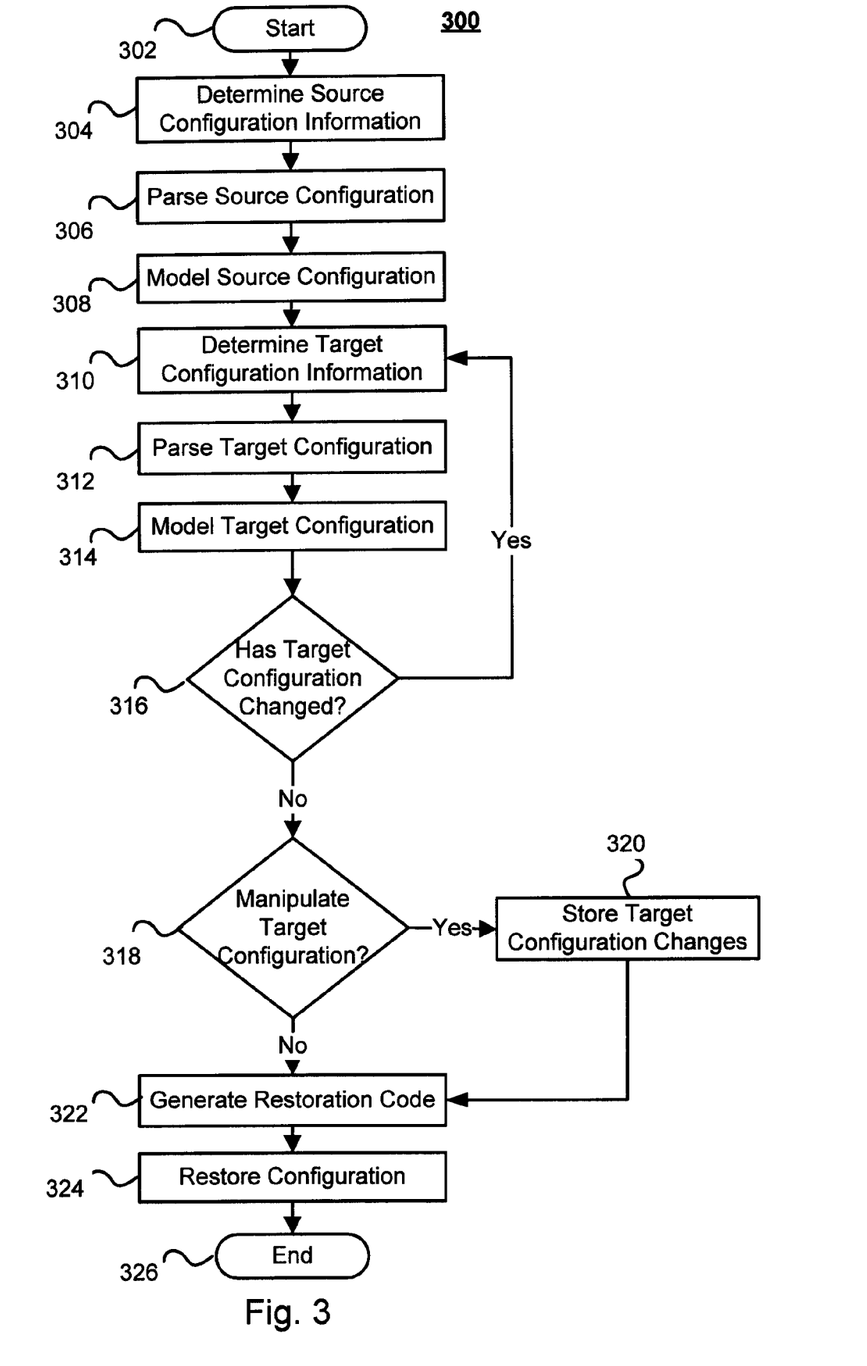
FIG. 3 depicts a method for file system restoration in accordance with an embodiment of the present disclosure.

Referring to FIG. 3, there is shown a method 300 for restoration of file system resources in accordance with an embodiment of the present disclosure. At block 302, the method may begin.

At block 304, the method may determine source configuration information. For example, data may be received or retrieved, which may enable the modeling of a source system, source computing platform, or a source file system.

At block 306, the source configuration information may be parsed. For example, a snapshot of a source configuration may be parsed to identify one or more necessary configuration details.

At block 308, a source configuration may be modeled. This may enable a user to view a source configuration and the relationships between one or more source configuration components.

At block 310, a target configuration of a target computing platform may be determined. In one or more embodiments, this may utilize software and/or hardware similar to block 304.

At block 312, the target configuration may be parsed. This may utilize software and/or hardware similar to block 306.

At block 314, the target configuration may be modeled. This may utilize software and/or hardware similar to block 308.

At block 316, the method may determine whether the target configuration has changed. This may enable storing of a source configuration and a target configuration in advance of utilizing the configurations. For example, an administrator may utilize the method to model the resources and configuration of a production host and the resources and configuration of a secondary or backup host. If the secondary host changes prior to a restoration, at block 316, the method may enable detection of the change and may prevent incompatibilities that could cause errors in a restoration process. For example, a discovery process may be run prior to generation of restoration code. The discovery process may verify a modeled target configuration. If a target configuration has changed, the method may continue at block 310. If a target configuration has not changed, the method may continue at block 318.

At block 318, the method determine whether a target configuration requires manipulation. In one or more embodiments, the method may prompt a user with a selection through a user interface. In one or more embodiments, the method may follow rules, constraints, or other logic to make adjustments to a target configuration. If a target configuration is changed, the method may continue at block 320. If a target configuration is unchanged, the method may continue at block 322.

At block 320, target configuration changes may be stored to a model of the target configuration. Target configuration changes may reflect adaptations to a source configuration model made to accommodate or to take advantage of a target configuration platform.

At block 322, the method may generate restoration code which may enable restoration of a source configuration on a target computing platform. Restoration code may be generated by navigating a model of a target configuration and producing executable code to restore one or more components of the target configuration.

At block 324, the method may execute the restoration code to restore a configuration of a source system to a target system. The restoration code may utilize one or more scripts, utilities, and/or tools.

At block 326, the method may end.

During execution of restoration code, the code may detect errors and handle errors. In some embodiments, one or more errors may be determined to be a result of a changed and/or inconsistent target configuration. Rediscovery of a target configuration, labeling of disks of a target configuration, regeneration of one or more portions of restoration code, retrying of a failed restoration command and/or other measures may be taken. In some embodiments, one or more measures may be taken automatically in response to an error. In one or more embodiments, a user may be prompted and allowed to input a desired action in response to an error.

Figure 4:
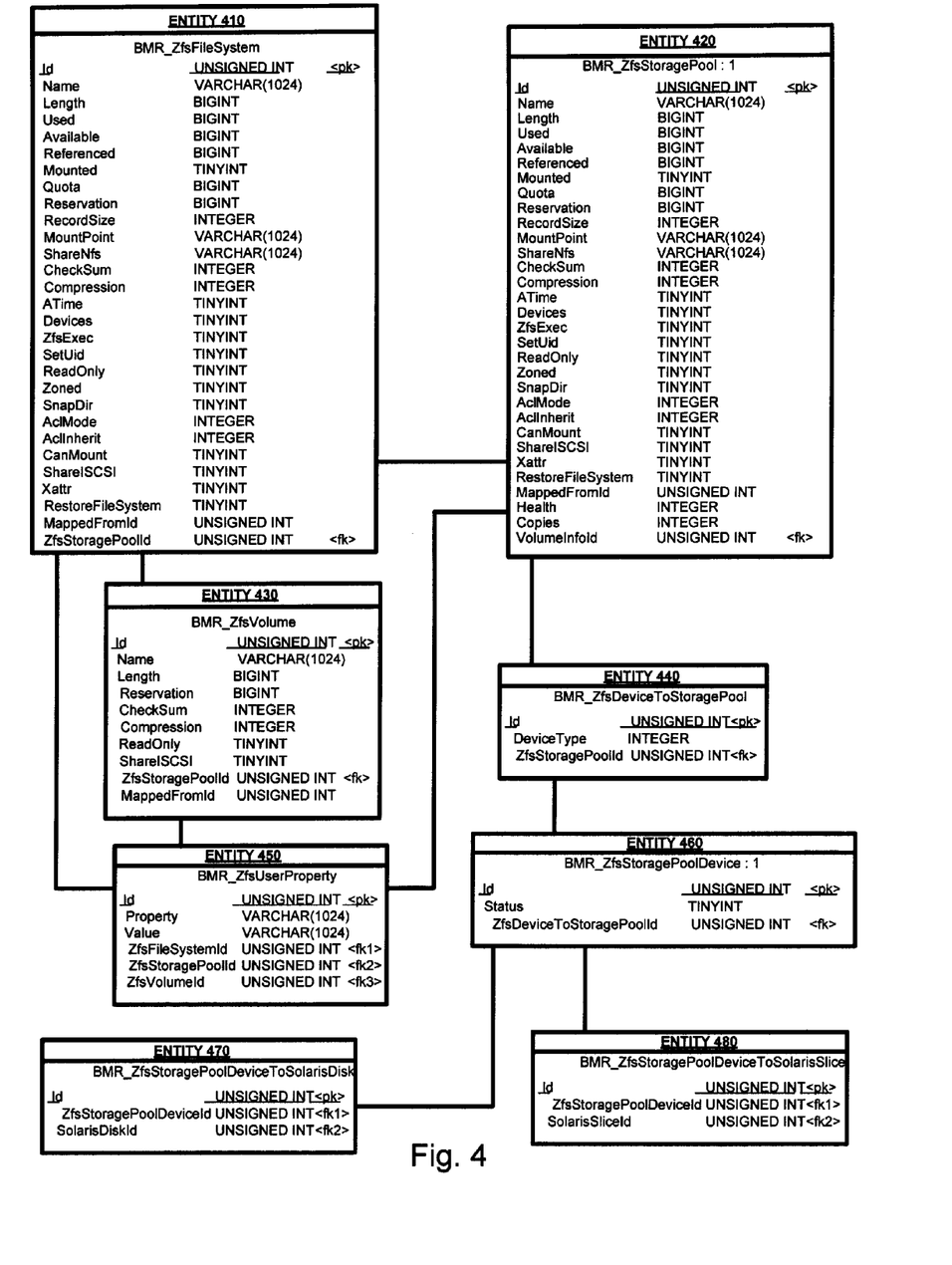
FIG. 4 depicts an entity relationship diagram for storing a modeled file system configuration for restoration of file system resources in accordance with an embodiment of the present disclosure.

Referring to FIG. 4, there is shown an entity relationship diagram for storing a modeled file system configuration for restoration of file system resources in accordance with an embodiment of the present disclosure. In one or more embodiments, FIG. 4 may represent a portion of a database schema for storing ZFS file system configuration information. The database schema may be designed so that it abstracts the setup of a ZFS storage pool directly. The database representation of a ZFS storage pool may be directly mapped to the zpool storage pool creation command. Additionally, the schema may be designed in an extendable way so that other operating systems that offer ZFS in the future may be added. In this exemplary embodiment, one or more entities may contain primary keys represented as <pk> in the diagram, which may ensure uniqueness of a row of data in a table. One or more entities may also contain one or more foreign keys which may be represented as <fk> in the diagram. Foreign keys may indicate a relationship to another entity in the diagram. A first column illustrated on the leftmost side of an entity in FIG. 4 may represent one or more column names. A second column, immediately to the right of the column names may represent the data type utilized by a column. A third column may contain a primary key or foreign key indicator.

Entity 410 may represent an entity utilized to store information related to one or more ZFS file systems. The ZfsStoragePoolId may provide a foreign key to a storage pool represented in entity 420.

Entity 420 may represent an entity utilized to store information related to ZFS storage pools.

Entity 430 may represent an entity utilized to store information related to ZFS Volumes. Entity 430 may contain a ZFS storage pool ID indicating which storage pool a ZFS volume belongs to.

Entity 440 may represent an entity utilized to model the relationship between a storage device and a storage pool.

Entity 450 may represent an entity utilized to store information related to user defined properties. User defined properties may be defined for one or more entities and entity 450 may contain one or more foreign keys. For example, entity 450 may contain a foreign key to a ZFS file system in entity 410, a ZFS storage pool in entity 420, or a ZFS volume in entity 430.

Entity 460 may represent an entity utilized to store information related to a storage pool device. A storage pool device may be a logical abstraction of one or more physical devices. Thus entity 460 may map to another entity storing information for one or more corresponding physical devices.

Entity 470 may represent an entity utilized to store information mapping physical storage devices to logical storage devices. In one or more embodiments, entity 470 may enable the mapping of one or more physical disks to one or more logical disks.

Entity 480 may represent an entity utilized to store information mapping one or more logical storage pool devices to one or more disk slices or partitions.

Although FIG. 4 is represented implementing a storage system for a ZFS configuration model other entities may be utilized to store further system information such as operating system information, hardware information, and network configuration information. Additionally, further entities may be utilized to store other file system configurations. In one or more embodiments, entities may be abstracted to a higher level so that one or more common concepts may be modeled in the same entities. For example, physical disks, logical disks, volumes, slices, and/or partitions may be stored in one entity apiece and attributes specific to a file system, operating system, hardware or configuration may be stored in name/value pairs or in other data structures.

In one or more embodiments, classes for file system restoration and/or bare metal restoration may be developed that may correspond to entities modeled in FIG. 4 and may utilize data stored in one or more entities.

Figure 5:
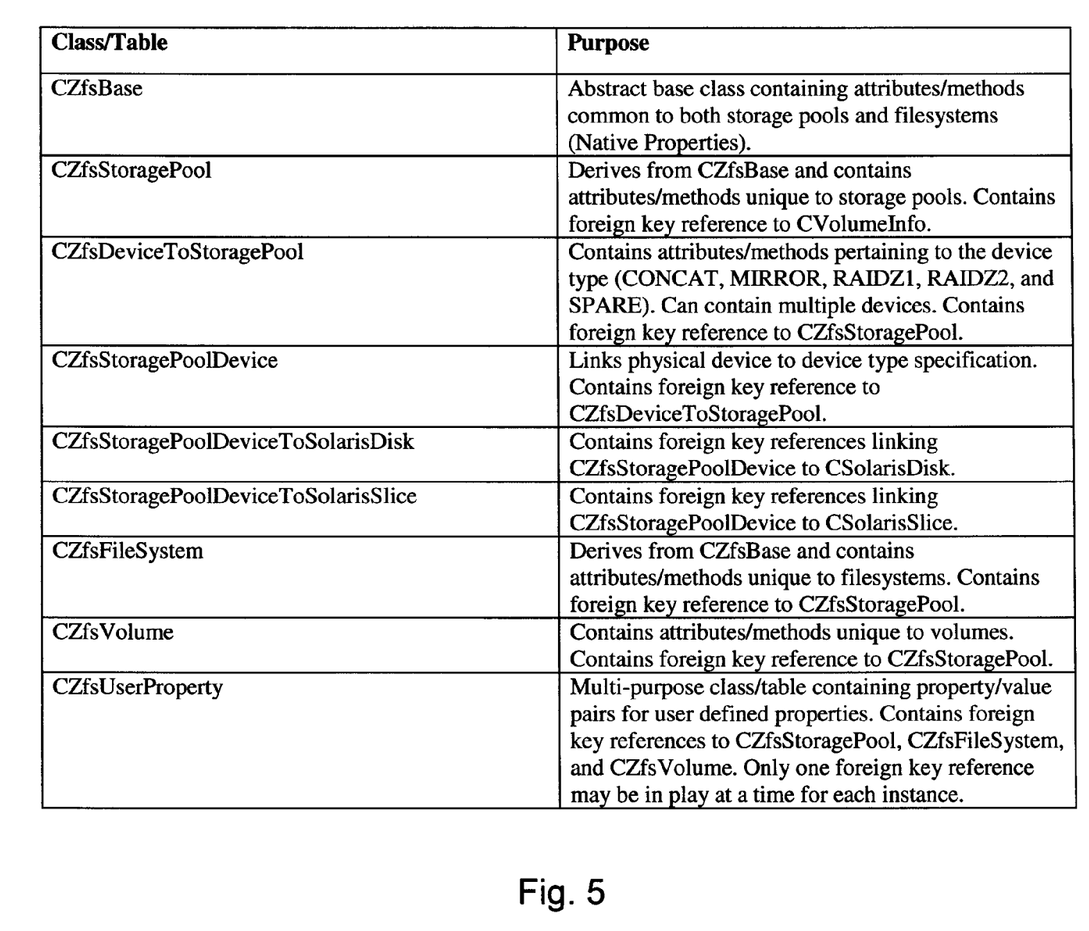
FIG. 5 depicts a class table of classes for implementing an object oriented method of restoration of file system resources in accordance with an embodiment of the present disclosure.

Referring to FIG. 5, there is shown a class table of classes for implementing an object oriented method of restoration of file system resources in accordance with an embodiment of the present disclosure. The classes listed may represent a subset of classes that may be utilized to perform a file system restoration for a ZFS file system.

A ZFS storage pool and ZFS filesystem may share common displayable attributes. Because of this an abstract base class CZfsBase may be developed to contain one or more of the attributes common to both storage pools and file systems. This may provide the opportunity to develop a lot of common code that both CZfsStoragePool and CZfsFileSystem may take advantage of.

In one or more embodiments, in order to expand the entities and classes defined to support other operating systems, one has to simply create a new class/table to link the physical device to the CZfsStoragePoolDevice class/table.

In some embodiments, commands native to an operating system or a file system may be utilized to collect information for modeling a configuration. For example, in order to collect all the information pertaining to a ZFS storage pool, the following commands may be implemented as part of a configuration discovery module:

For Each Storage Pool:
    zpool list <storage pool>
    zpool status <storage pool>
    zfs get all <storage pool>

For Each Filesystem:
    zfs get all <filesystem>

For Each Volume:
    zfs get all <volume>

These commands may be implemented as part of one or more class files. One or more portions of the output from these commands may provide the information to model a ZFS storage pool. This model may be stored according to the structures described with reference to FIG. 4 above.

In one or more embodiments, these commands may be executed utilizing an enum representation that is built into a configuration discovery or configuration saving process to facilitate the running of the correct parser. The following table represents the parser run to parse each command and the enum that links them together:

| Client side command | Enumeration | Parser to run |
|---|---|---|
| zpool list <storage pool> | ZPOOL_LIST_NUM | ParseZpoolList ( ) |
| zpool status <storage pool> | ZPOOL_STATUS_NUM | ParseZpoolStatus ( ) |
| zpool get all <storage pool> | ZPOOL_GET_ALL_NUM | ParseZpoolGetAll ( ) |
| zfs get all <filesystem\|volume> | ZFS_GET_ALL_NUM | ParseZfsGetAll ( ) |

Each parser may be responsible for storing various parts of the configuration.

Additionally, code may be utilized for Solaris disks to set the CSolarisDisk::m_LabelType enum to represent the disk as either SMI or EFI labeled. The decision may be performed based on the absence or presence of non-zero values a Solaris disk model, which may only be set in the case of EFI labeled disks.

Native property attributes common to both storage pools and file systems may utilize a template function that may parse and store these attributes for either CZfsStoragePool or CZfsFileSystem.

In one or more embodiments, the output of the ZFS commands may represent lengths in decimal point notation to the tenths position (i.e. 1.5 M, 32.3 G, etc.). Thus methods utilizing these commands may properly calculate these values to one decimal position when calculating volume information.

One or more embodiments, may enable the restoration of ZFS storage pools. The restoration of ZFS storage pools may involve initializing the destination disks, creating the storage pool, creating the file systems and volumes and setting one or more user properties on one or more resources.

Some embodiments for the restoration of ZFS file systems may enable the detection, viewing, and labeling of SMI and EFI disk labels. ZFS file systems may utilize only EFI disk labels, thus it may be desired to verify disk labels during discovery, during mapping and/or during restoration of a ZFS file system. This may enable recovery if a disk label is accidentally corrupted. In one or more embodiments, a user interface, such as a GUI or a prompt driven command interface, may enable the detection, viewing, and labeling of SMI and EFI disk labels.

If a disk is discovered to be SMI, it may be relabeled as an EFI disk label for use in a ZFS storage pool. Once the disk re-labeling operation is completed a normal discovery may proceed so that the proper disk geometry relative to the disk label in place for each disk may be recorded in the configuration.

ZFS storage pools may not be used as boot devices. Because of this, once it is confirmed that one or more of the correct disks are available, the restore process may not start to create the ZFS storage pools until after other resources have been created and other file systems have been successfully mounted. The method may wait in order to make one or more of the proper mount points available for ZFS operations. Therefore, the main storage pool creation function may not appear in a restore script until after the main loop that mounts one or more other (non-ZFS) filesystems.

A main function for starting the process of creating the storage pool may first determine what one or more destination disks have as a disk label and may change the label to the desired label type if needed. In some embodiments, comparison checks may be performed on disk lengths and not on disk labels. This may enable the zpool command to lay down individual slices for an EFI labeled disk. Therefore, if the main function encounters an SMI labeled disk but it has passed the length check, we may allow that restoration to proceed because as the disk is added into the storage pool, it may be setup properly by the zpool command.

Disk labeling may enable the creation slices if needed. This may enable the configuration of a storage pool which is slice-based as opposed to being disk-based.

After the labeling and slicing of one or more disks, the storage pool may be created. The creation of each storage pool may be made by specifying an alternate mount point under ${MNT} (/tmp/mnt) similar to other filesystems which may be restored. Later on in the post-restoration cleanup process, the mount point attribute within each storage pool and filesystem may be changed to reference from the real root ("/"). Thus, restoration commands may list:

${ZPOOL} create -f -m ${MNT}/tank1 tank1 c0t1d0 c0t2d0

One or more commands may be followed by subsequent verification steps. This may ensure that a command executed successfully. If an error was encountered, one or more commands may be retried and may be verified for successful completion.

After the creation of the storage pool, code may be executed that may sets one or more of the native properties, and subsequently one or more user properties, of the storage pool. In some embodiments, this may not include the "mountpoint" native property. This property may be set properly at the end of the restoration process.

Once the storage pool has been created, the restore script may create one or more file systems and volumes within the storage pool and may set native and/or user properties for each. Again, the "mountpoint" property may not be set on one or more file systems until the end of the restoration.

Because the storage pool is treated as a file system itself, it may be specified for restoration because a user may have put files directly underneath the main storage pool mount point. For restoration of one or more file systems, there are two lists that may be maintained in two separate files that may be utilized at post-restore processing time and first boot time.

The Two Files are:

${MNT}/bmr.zfs.import ${MNT}/bmr.zfs.restored

The file ${MNT}/bmr.zfs.import may be utilized so that the first boot process knows what filesystems to import as the machine is first coming up. The file ${MNT}/bmr.zfs.restored may be utilized at post-restore processing time and first boot time so the change to the "mountpoint" attribute may be made. The list of restored ZFS filesystems may be separated out from the standard list of restored filesystems stored in file /tmp/restorelist. ZFS does not support standard mount and unmount operations because it is handled through the setting of the "canmount" attribute of the ZFS resource. Therefore, these commands may be separated out into their own list to allow control over the ZFS resources.

After restoration of one or more ZFS file systems has completed but before one or more other file systems have been unmounted, preparation may occurs for the first boot. The first boot script may have additions to it that may perform the following:

if [ -f "/bmr.zfs.import" ]

then while read sp do

/usr/sbin/zpool export ${sp}

/usr/sbin/zpool import -f ${sp} done </bmr.zfs.import rm -f /bmr.zfs.import fi if [ -f "/bmr.zfs.restored" ]

then while read fs do

/usr/sbin/zfs set canmount=on ${fs} done </bmr.zfs.restored rm -f /bmr.zfs.restored fi

If the above steps are not done correctly at first boot, the ZFS storage pool may not be available after the restoration has completed. Each storage pool to be imported may first be exported to clean up any stale information and then it may be re-imported. The second part of the above script may re-mount each file system by setting the "canmount" attribute. The end of the restore script may have the following code:

We must unmount all recreated ZFS storage pools and filesystems and reset their mount points to be correct.

for i in `cat ${MNT}/bmr.zfs.restored|sort -r` do

${ZFS} set canmount=off ${i} done ${ZFS} set mountpoint=/tank1/fs1 tank1/fs1 2>/dev/null ${ZFS} set mountpoint=/tank1 tank1 2>/dev/null ${ZFS} set mountpoint=/tank2/fs2 tank2/fs2 2>/dev/null ${ZFS} set mountpoint=/tank2 tank2 2>/dev/null Each file system may first be unmounted if it was mounted at the restore point (${MNT}) alternate mount point and then the process may set each mountpoint attribute properly. Because each file system now has "canmount=off", the first boot script may re-mount it. The first boot script may utilize the "canmount=on" in the first boot script as noted above.

ZFS storage pools may not have to be mounted only at default locations based off the root filesystem. For example, a storage pool named tank with a default mount of /tank may alternately be mounted anywhere by changing the "mountpoint" native property. The setting of the "mountpoint" property at the end of the restore process may take advantage of this flexibility.

In one or more embodiments, it may be possible to restore ZFS file systems to dissimilar configurations, such as dissimilar disks. The dissimilar configurations restoration operations for ZFS may be encapsulated into one or more classes including:

1. CZfsBaseResource
2. CZfsStoragePoolResource
3. CZfsFileSystemResource
4. CZfsVolumeResource Taking advantage of the database schema design of having an abstract base class for common attributes, the design mirrors this setup closely. The CZfsBaseResource may derive from a parent class which is file system agnostic. CZfsStoragePoolResource and CZfsFileSystemResource may derive from CZfsBaseResource through multiple inheritance. This design may allows for common code to handle one or more common attributes.

The following assumptions may be made when talking about mapping operations for ZFS resources:

1. If mapping or creating anything other than a concatenated storage pool, one or more devices specified must be the same length.
2. If slices are utilized for mapping or creating storage pools, one global slice length may be specified for one or more slices.

One or more of the standard user modifiable native properties of ZFS resources may be modified via an attributes option. The following is the list may be applicable to both storage pools and file systems. ZFS volume attributes may be a subset of this list.

quota=<quota size>
reservation=<reservation size>
recordsize=<record size>
mountpoint=<mount point>
sharenfs=<sharenfs opts>
checksum=<on|off|fletcher2|fletcher4|sha256>
compression=<on|off|lzjb>
atime=<true|false>
devices=<true|false>
exec=<true|false>
setuid=<true|false>
readonly=<true|false>
zoned=<true|false>
snapdir=<visible|hidden>
aclmode=<discard|groupmask|passthrough>
aclinherit=<discard|noallow|secure|passthrough>
canmount=<true|false>
shareiscsi=<true|false>
xattr=<true|false>
userproperty=<property>=<value>

There may be code implemented to disallow the mapping of non-ZFS resources to disks that have EFI disk labels. A disk at the same physical connection location as a disk previously in the system but with a different labeling scheme may be treated as a new disk with different or unknown geometry. Discovery and verification of a disk label may be utilized in these situations so we can learn the intended usage of the disk.

At this point it should be noted that restoration of file system resources in accordance with the present disclosure as described above typically involves the processing of input data and the generation of output data to some extent. This input data processing and output data generation may be implemented in hardware or software. For example, specific electronic components may be employed in a modeling a file system configuration or similar or related circuitry for implementing the functions associated with mapping a file system configuration to a target host in accordance with the present disclosure as described above. Alternatively, one or more processors operating in accordance with instructions may implement the functions associated with file system restoration in accordance with the present disclosure as described above. If such is the case, it is within the scope of the present disclosure that such instructions may be stored on one or more processor readable media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A method for restoring file system resources comprising:
   determining, using at least one computer processor, source configuration information of one or more file system resources;
   modeling a source configuration based at least in part on the source configuration information;
   determining target configuration information;
   modeling a target configuration based at least in part on the target configuration information;
   generating restoration instructions to map the source configuration to the target configuration; and
   executing the restoration instructions to restore the one or more file system resources of the source configuration to the target configuration, wherein restoration instructions are configured to re-label a disk label in the event a disk label of the target configuration is incompatible with the source configuration.

2. The method of claim 1, wherein the one or more file system resources comprise file system resources of a ZFS file system.

3. The method of claim 2, further comprising restoring the one or more ZFS file system resources as part of a bare metal restore.

4. The method of claim 1, wherein the source configuration and the target configuration are not similar.

5. The method of claim 1, further comprising providing an interface for manipulation of the target configuration to enable restoration to the target configuration which is different from the source configuration.

6. The method of claim 5, wherein the manipulation of the target configuration enables a mapping between dissimilar target configurations including at least one of: mapping a mirrored configuration to an un-mirrored configuration, mapping a striped configuration to an unstriped configuration, mapping between different levels of RAID configurations, and mapping between a configuration with spare storage to a configuration without spare storage.

7. The method of claim 1, wherein modeling a source configuration comprises parsing the source configuration information and the parsed source configuration is represented as one or more configuration objects.

8. The method of claim 7, wherein the configuration objects represent file system components in a hierarchical order.

9. The method of claim 8, wherein the hierarchical order of a model of file system objects in the source configuration facilitates the restoration of objects on the target configuration.

10. The method of claim 9, wherein the hierarchical order of a model of file system objects in the source configuration enables a restoration program to traverse a hierarchical tree from lower level objects to higher level objects to generate executable code to restore the target configuration.

11. The method of claim 1, further comprising verifying the target configuration before generating restoration instructions.

12. The method of claim 11, wherein verifying the target configuration comprises verifying at least one of: a configuration component, a disk label, and a storage pool size.

13. The method of claim 1, further comprising performing error handling when executing restoration instructions.

14. The method of claim 13, wherein performing error handling comprises accepting input specifying a network location of a substitute target configuration to utilize for restoration of the one or more file system resources.

15. The method of claim 1, further comprising storing one or more of the source configurations.

16. At least one non-transitory processor readable storage medium for storing a computer program of instructions configured to be readable by at least one processor for instructing the at least one processor to execute a computer process for performing the method as recited in claim 1.

17. An article of manufacture for restoring file system resources, the article of manufacture comprising:
   at least one non-transitory processor readable storage medium, and
   instructions carried on the at least one storage medium;
   wherein the instructions are configured to be readable from the at least one storage medium by at least one processor and thereby cause the at least one processor to operate so as to:
   determine source configuration information of one or more file system resources;
   model a source configuration based at least in part on the source configuration information;
   determine target configuration information;
   model a target configuration based at least in part on the target configuration information;
   generate restoration instructions to map the source configuration to the target configuration; and
   execute the restoration instructions to restore the one or more file system resources of the source configuration to the target configuration, wherein restoration instructions are configured to re-label a disk label in the event a disk label of the target configuration is incompatible with the source configuration.

18. A system for restoring file system resources comprising:
   one or more processors communicatively coupled to a server; wherein the server is configured to:
   determine source configuration information of one or more file system resources;
   model a source configuration based at least in part on the source configuration information;
   determine target configuration information;
   model a target configuration based at least in part on the target configuration information;
   generate restoration instructions to map the source configuration to the target configuration; and
   execute the restoration instructions to restore the one or more file system resources of the source configuration to the target configuration, wherein restoration instructions are configured to re-label a disk label in the event a disk label of the target configuration is incompatible with the source configuration.

19. The system of claim 18, wherein the one or more file system resources comprise file system resources of a ZFS file system.

20. The system of claim 19, further comprising restoring the one of more ZFS file system resources as part of a bare metal restore.

* * * * *